J. H. HAMMON.
SPECTACLE LENS.
APPLICATION FILED FEB. 19, 1919.
1,354,040. Patented Sept. 28, 1920.
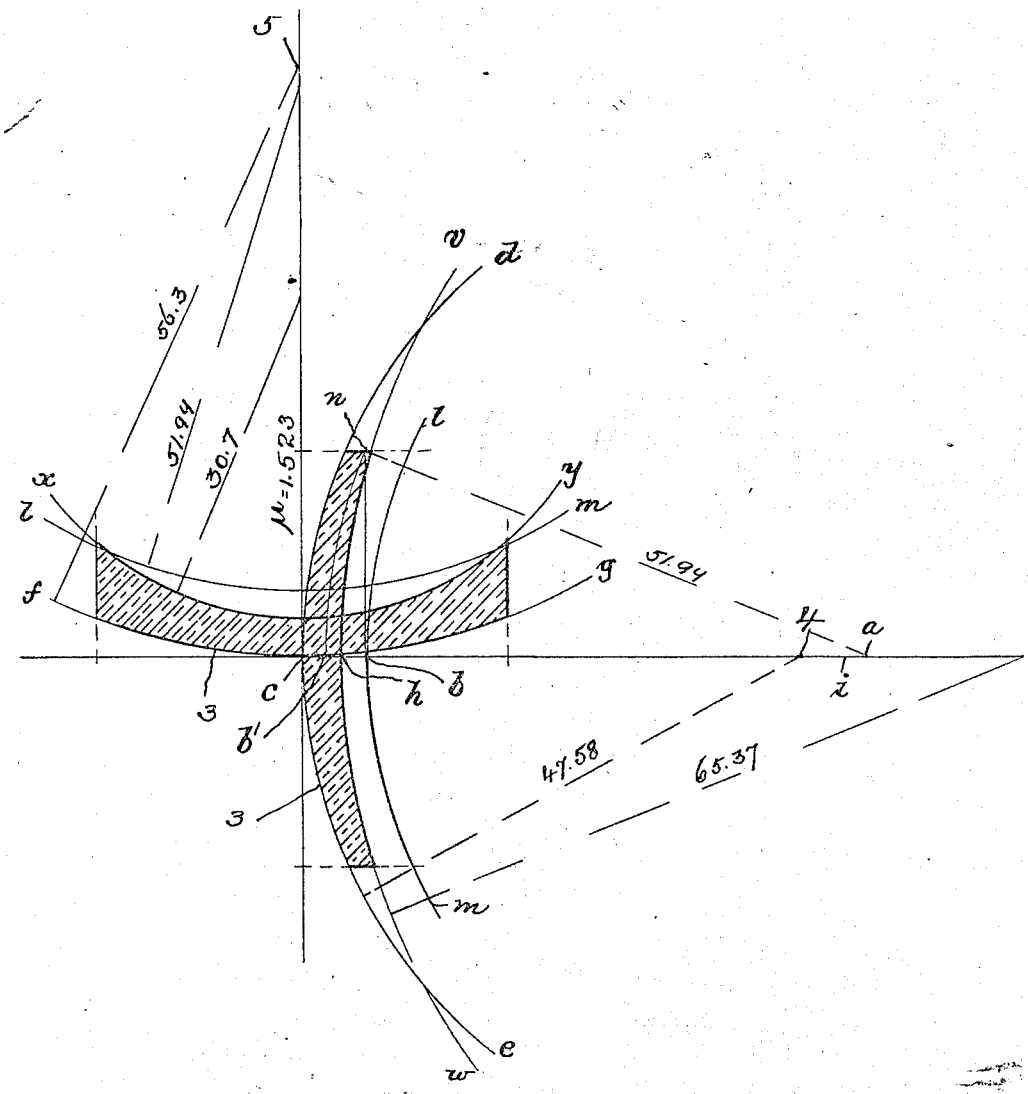
Inventor.
James H. Hammon.

UNITED STATES PATENT OFFICE.

JAMES H. HAMMON, OF VINCENNES, INDIANA.

SPECTACLE-LENS.

1,354,040.  Specification of Letters Patent.  Patented Sept. 28, 1920.

Application filed February 19, 1919. Serial No. 277,964.

*To all whom it may concern:*

Be it known that I, JAMES H. HAMMON, a citizen of the United States, and a resident of Vincennes, Knox county, Indiana, have invented certain new and useful Improvements in Spectacle-Lenses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to ophthalmic lenses, and has for its object to increase the angle of distinct vision for such lenses, and eliminate a part of the spherical aberration in the marginal zone of the lens, thereby obtaining a clearer definition in the direct field of vision through the marginal zone of the lens and increasing the quantity of light entering the eye, resulting in increased illumination or distinctness of vision.

Another result obtained by my structure is that all reflections arising from objects behind the glass are rendered invisible.

From a commercial aspect, it permits the optician to carry in stock all lenses of a standard form with the front surface finished, so that only the rear surface need be ground.

In the accompanying drawing my improved lens is shown in rectangular section.

My novel lens is distinguished from other lenses by having a convex surface for its front, and this convex surface may be toric, spherical, parabolic, elliptical or hyperbolic, which surfaces are developed with respect to the center of rotation of the eye-ball.

The front surface is constructed so that, for example, if it be a sphere, the center of the sphere is at the center of rotation of the eye for the correct position of the spectacle glass. Such a front surface permits all pencils of light that enter the eye from the indirect field of vision to approach such surface in the same manner as similar rays along the principal optical axis of the lens, and when the eye is rotated from the principal optical axis of the lens it permits the eye to receive rays in the direct field of vision through the marginal zones of the lens under the same refractive conditions as when not rotated therefrom.

This means, that direct vision through the marginal zones or edges of the glass is as clear as through the middle of the glass, and substantially without spherical aberration for the visual field.

In the spectacle glass as illustrated I have assumed the usual American glass whose refractive index is $\mu = 1.523$, and by way of example have shown a bi-toric lens whose front surface 3 is toric in form and is calculated for a power of $+10$ and $+12$ diopters at the rear vertex on the eye side of the finished lens, 4 mm. back of the front vertex of the lens, and have selected the shorter radius $c-4$ of 47.58 mm. calculated to give the power of $+12$ diopters at the rear vertex of the finished lens and the longer radius $c-5$ of 56.3 mm., giving the power of $+10$ diopters at the rear vertex.

The actual center of rotation of the eye $i$ is to be at a distance from the front surface along the common axis of the two curves of the front surface equal to the average of their radii, or 51.94 mm.

This will enable me to elect one or more standard surfaces for each kind of the curved surfaces mentioned, so that the optician will do all his grinding on the back surface of the lens in order to fill his prescription.

This is of importance for multifocal lenses, where the segmental addition or additions either cemented or fused to the spectacle glass is delivered to the optician with the selected standard front surface, so that the optician can fill any prescription with a very limited number of blanks having finished front faces.

The power of the entire combination of curved surfaces, (front and back surfaces), is determined with respect to an imaginary surface whose center is the center of rotation of the eye-ball, so that, theoretically, both the front and back surfaces are tangent at the back vertex of the lens, instead of being computed from an imaginary nodal point on the optical axis at the common center between the so-called principal planes of the several surfaces.

The eye in rotating about its center of rotation also rotates at the center of this imaginary surface, which surface, if the outer surface of the lens be spherical, is concentric with the spherical surface, so that no matter at what angle the eye is turned from the optical axis of the lens, the radius from the center of rotation of the eye to the outer surface of the lens is constant, or approximately so, and when the outer surface is a sphere it is always constant. This eliminates spherical aberration for the direct and indirect fields.

To calculate the power of the lens from the vertex of the rear surface of the lens point $h$, I assume the mentioned imaginary curved surface in front of the eye-ball at or near the position that I desire the back vertex of the lens to be in the finished lens. The radius of this surface $l$—$m$ is found by multiplying the cosine of one-half the arc, whose radius is the mean of the radii of the front surfaces and whose chord is the mean diameter of the lens, by said mean of the radii of the front surfaces. The center of this arc is the apparent center of rotation $a$ of the eye ball. This arc cuts the optical axis at $b'$. I then determine the position $c$ for the front vertex of the finished lens, having in the example given a $+10$ and $+12$ diopters effective 4 mm. behind the front vertex $c$, placing the same on the optical axis in front of the point $b$ where the imaginary surface $l$—$m$ crosses the optical axis; the distance in front is governed by the thickness of the glass required to develop the front curves, which in the example given is 4.8 mm. minimum, to which I add about 1.7 mm. for safety in grinding, thus giving the front vertex at 6.5 mm. from $b$ at the point $c$; and then pass the curves $f$—$g$ and $d$—$e$ through this point.

On account of the thickness of glass of 1.7 added, the apparent position of $a$ will be shifted a like amount to the actual center $i$ of rotation of the eye and $l$—$m$ will shift, so that the curve $n$—$b'$ will pass through the front vertex $c$.

Opticians calculate the lens thickness along the optical axis by well known formulæ, dependent upon the size of the finished lens and refractive index of the glass, or main glass if it is a multifocal lens, allowing any amount desired for strength at center or outer edges.

In the bi-toric lens illustrated, this imaginary surface $l$—$m$ will now be situated back of the vertex $c$ of the front face a distance equal to the versine of the angle $n$—$a$—$b$, where $n$—$b$ is one-half the mean diameter of the lens and the radius is 51.94 mm. multiplied by this radius and whose center is at the actual center of rotation $i$ of the eyeball. The length of the radius is equal to the cosine of the angle $n$—$a$—$b'$ multiplied by the radius 51.94 mm. The lens is to have its refractive power computed from the back vertex $h$ of the lens.

In the example given 4 mm. shall be the thickness of the lens at the vertex, and the blanks are so indicated. This enables the optician to grind lenses of many different powers from the same kind of blank. In said example the point $h$ is given as the vertex of the rear surface.

We then compute in the customary manner the curve or curves of the back surfaces so that the total power of the finished lens will be equal to the refractive powers of the front and back surfaces effective at the back or rear vertex on the eye side of the lens.

If the prescription to be filled is a $+4$ diopters sphere combined with a $-11$ diopters cylinder, the radii of the curves to be combined with the front surface to give these powers are found to be 65.37 and 30.7 mm. radius, respectively. The back surfaces $v$—$w$ and $x$—$y$ are then ground tangent at the point selected for the back vertex, (point $h$) so that all the powers on both surfaces shall produce a refractive power equivalent to that power indicated by the prescription, measured from the back vertex, and the actual center of rotation of the eye will be at the point $i$, a distance from the front surface equal to the radius of the mean diameter of the front surfaces.

I claim—

1. A spectacle glass whose convex front surface is normal to the field of direct vision through all points in the visual field.

2. A spectacle glass blank having a finished convex front and an unfinished back, whose front surface is ground to be normal to the field of direct vision through all points of the surface.

3. A lens whose focal length is measured from the vertex on the eye side of the lens.

4. A spectacle glass blank having a finished front face, whose power is measured with reference to a point behind the front vertex, through which point the curvature or curvatures of the rear surface is to pass, and from which point the power of the finished lens is measured.

5. A spectacle glass the mean center of whose front surface is the center of rotation of the eye-ball.

6. A lens whose total focal power is the algebraic sum of the focal powers of the front and back surfaces effective as if tangent to one another at the rear vertex of the lens.

7. A spectacle glass blank having a finished front surface whose mean radius is substantially the distance of the center of rotation of the eye-ball from said surface and is of sufficient thickness to grind a rear surface thereon, the power of the finished lens being the algebraic sum of the powers of the front surface whose radius is diminished by the thickness of the finished lens and the back surface, whereby the two surfaces may be considered tangent at the rear vertex for the purpose of calculating the power of the finished lens.

In testimony that I claim the foregoing as my invention, I have signed my name.

JAMES H. HAMMON.